United States Patent
Frokjaer et al.

(10) Patent No.: US 8,827,660 B2
(45) Date of Patent: Sep. 9, 2014

(54) VARIABLE CAPACITY OIL PUMP

(75) Inventors: Poul Spaerhage Frokjaer, Gistrup (DK); Jens Demtroder, Ronde (DK)

(73) Assignee: Vestas Wind Systems A/S, Aarhus N. (DK)

( * ) Notice: Subject to any disclaimer, the term of this patent is extended or adjusted under 35 U.S.C. 154(b) by 145 days.

(21) Appl. No.: 13/416,581

(22) Filed: Mar. 9, 2012

(65) Prior Publication Data

US 2012/0164001 A1   Jun. 28, 2012

Related U.S. Application Data

(63) Continuation of application No. 10/592,693, filed as application No. PCT/DK2004/000916 on Dec. 23, 2004, now abandoned.

(30) Foreign Application Priority Data

Mar. 12, 2004   (DK) .......................... PA 2004 00409

(51) Int. Cl.
    *F04B 17/02*   (2006.01)
    *F04B 49/20*   (2006.01)
    *F04B 41/06*   (2006.01)

(52) U.S. Cl.
    CPC ................. *F04B 49/20* (2013.01); *F04B 17/02* (2013.01); *F04B 41/06* (2013.01)
    USPC ........... 417/336; 417/334; 417/216; 417/429; 417/287; 417/426; 417/53

(58) Field of Classification Search
    CPC ........... F04B 49/20; F04B 41/06; F04B 17/02
    USPC ........... 417/334, 336, 216, 426, 428, 429, 53, 417/287
    See application file for complete search history.

(56) References Cited

U.S. PATENT DOCUMENTS 2,194,054 A * 3/1940 Peterson .................... 417/247
2,539,862 A   1/1951 Rushing (Continued)

FOREIGN PATENT DOCUMENTS

| DE | 3622217 A1 | 1/1988 |
| DE | 3727633 A1 | 3/1989 |
| DE | 10104635 A1 | 10/2002 |
| GB | 2201200 A | 8/1988 |

OTHER PUBLICATIONS

Examination Report issued in European Patent Application No. 04 803 066.2-1267; Jun. 27, 2012; 15 pages; European Patent Office.

(Continued)

*Primary Examiner* — Charles Freay
*Assistant Examiner* — Christopher Bobish
(74) *Attorney, Agent, or Firm* — Wood, Herron & Evans, LLP

(57) ABSTRACT

The invention relates to a wind turbine being provided with a fluid displacement means for ensuring a certain increased pumping capacity at a certain reduced rotational speed of the main shaft of the rotor and thus of a drive shaft from a gear box of the wind turbine. The invention also relates to a wind turbine being provided with fluid displacement means for ensuring a certain increased pumping capacity at a certain increased rotational speed of the main shaft of the rotor and thus of a drive shaft from a gear box of the wind turbine. The means may be mechanical, hydraulic, pneumatic or electrical. Additionally, the invention relates to a method for operating a wind turbine being provided with such fluid displacement means.

19 Claims, 5 Drawing Sheets

(56) References Cited

U.S. PATENT DOCUMENTS

| | | | |
|---|---|---|---|
| 3,683,249 A | | 8/1972 | Shibata et al. |
| 3,873,244 A | | 3/1975 | Jaggi |
| 4,047,848 A | | 9/1977 | Poole |
| 4,505,645 A | * | 3/1985 | Laguilharre .................... 417/69 |
| 5,125,806 A | | 6/1992 | Quick et al. |
| 5,775,881 A | * | 7/1998 | Stich ............................. 417/287 |
| 5,888,051 A | | 3/1999 | McLoughlin et al. |
| 7,201,884 B2 | | 4/2007 | Cohen |

OTHER PUBLICATIONS

Author Unknown; English Translation of the Text of the Fourth Office Action issued in Chinese Patent Application No. 200480042410.7; Apr. 8, 2011; 5 pages; Chinese Patent Office.

Office Action issued in U.S. Appl. No. 10/592,693; May 9, 2011; 15 pages; U.S. Patent and Trademark Office.

Office Action issued in U.S. Appl. No. 10/592,693; Nov. 14, 2011; 24 pages; U.S. Patent and Trademark Office.

* cited by examiner

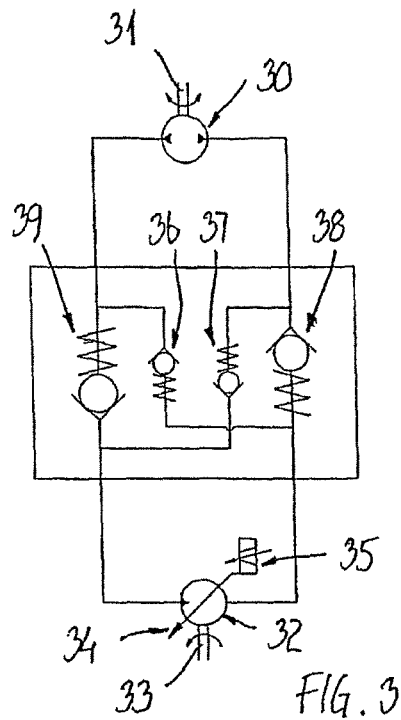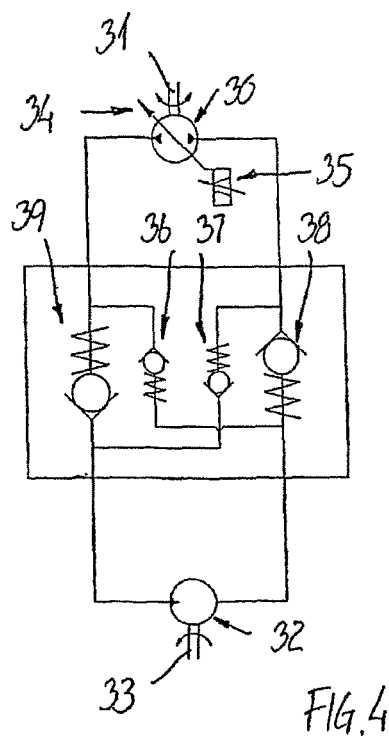
FIG. 3
FIG. 4
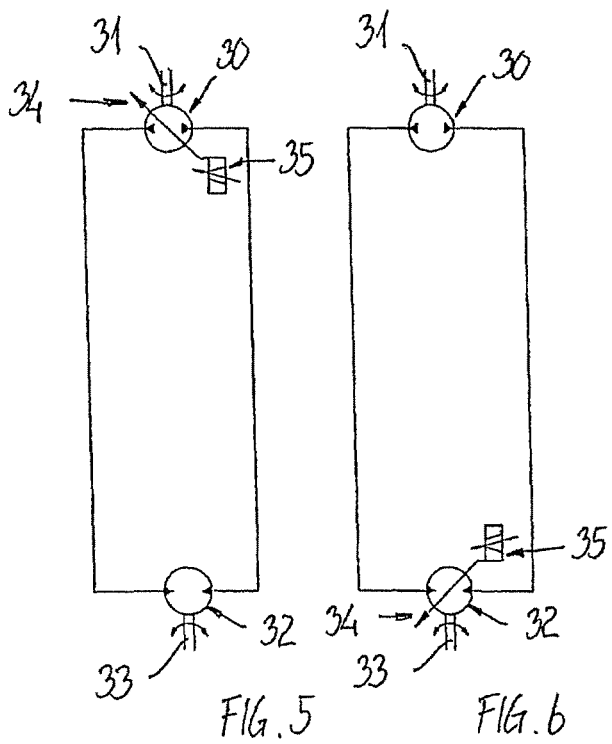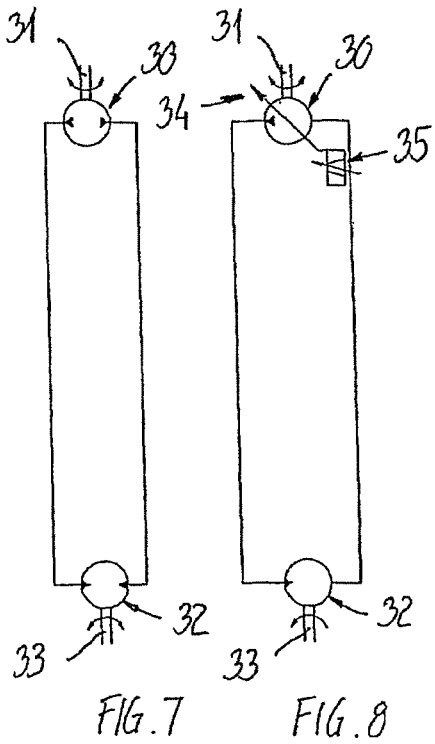
FIG. 5   FIG. 6   FIG. 7   FIG. 8

VARIABLE CAPACITY OIL PUMP

CROSS-REFERENCED TO RELATED APPLICATIONS

This application is a continuation of U.S. patent application Ser. No. 10/592,693 filed Sep. 26, 2007, which is a U.S. national phase patent application of PCT/DK2004/000916 filed Dec. 23, 2004, which claimed priority to Denmark Application No. PA 2004 00409 filed Mar. 12, 2004. Each of these applications is incorporated herein by reference in its entirety.

TECHNICAL FIELD

The invention relates to a fluid displacement pump having a drive shaft, and where the pump is provided with a coupling arrangement between at least a first pumping member and at least a second pumping member. The invention also relates to a fluid supply system comprising a fluid inlet and a fluid outlet of the first pump and a fluid inlet and a fluid outlet of the second pump. Furthermore, the invention relates to a wind turbine with a fluid supply system comprising a fluid displacement pump. The invention also relates to a method of controlling a fluid pressure in a fluid supply system of a wind turbine.

BACKGROUND

Lubrication and cooling of mechanical equipment such as gearboxes, bearings or combustion engines is typically obtained by either of the following principles:

An oil pump with constant geometric volume is driven by a constant or variable speed electric motor, more recently also by frequency controlled motors allowing a continuous variation of the pump speed and thereby the oil flow. This arrangement allows continuous adjustment of the flow to the momentary needs by an external controller as long as electrical power is available. In case of loss of this external source of energy, the oil flow ceases, and a safe run-down of the equipment cannot be granted.

An oil pump with constant geometric volume is driven by a shaft of the equipment, for example a power-take-off (PTO) from a gearbox. The oil flow is hence directly dependent on the speed of the drive shaft, and cannot be adjusted to the momentary needs. This becomes a particular disadvantage in applications where the speed of the PTO-shaft varies. Obtaining sufficient oil supply at the lowest operating speeds may require selection of quite large pumps, which will then supply too much oil in the upper speed range. The surplus oil needs to be wasted through bypasses, which increases the system's complexity.

Additionally, excessive circulation deteriorates the oil, causes premature aging, and will typically require increased oil volumes. Compared to electrical driven pumps, such shaft driven pumps allow a safe run-down also in case the external power supply collapses. The efficiency will typically be higher, as no additional power transformation is required.

A common solution combining the advantages of shaft-driven and electrical pumps is installing two independent systems where the shaft-driven pump cares for sufficient supply when no external power is available, and where the electrical pump or both, i.e, also the shaft-driven pumps in parallel provide the oil supply in regular operation. Two independent systems are more costly and more complex systems Shaft driven pumps, where the geometric volume of the oil pump is varied, is a third possibility of obtaining variable oil flow independent of the speed of the equipment. This technology is typically used in automotive systems and hydraulic applications, but has technical limitations for large oil flow, or for fluids with high viscosity as typically used in industrial applications, due to the limited suction capacity of those pump designs.

SUMMARY

It is one object according to one aspect of the present invention to combine the advantages of a shaft driven fluid pump such as an oil pump in respect to safe run-down with the variable flow characteristics of electrically driven pumps for lubrication systems for large fluid flow and high viscosity.

It is another object according to a second aspect of the present invention to combine the advantages of a shaft driven fuel pump such as an oil pump in respect to safe run-up with the variable flow characteristics of electrically driven pumps for lubrication systems for large fluid flow and high viscosity.

The object of the invention according to the first aspect of the invention may be obtained by a pump being provided with a coupling arrangement between at least a first pumping member and at least a second pumping member, said at least first and second pumping members in total exhibiting a certain increased pumping capacity at a certain reduced rotational speed of the drive shaft.

By providing an increased pumping capacity at a certain reduced rotational speed of the drive shaft, chosen mechanical parts such as the gearbox of a wind turbine, said parts still being in limited motion during idling of the wind turbine, will be provided a much better lubrication despite the often very limited rotational speed of the rotor.

The object of the invention according to the second aspect of the invention may be obtained by a pump having a drive shaft, said pump being provided with a coupling arrangement between at least a first pumping member and at least a second pumping member, said at least first and second pumping members in total exhibiting a certain increased pumping capacity at a certain increased rotational speed of the drive shaft.

By providing an increased pumping capacity at a certain increased rotational speed of the drive shaft, a wind turbine, when in an emergency situation, will be provided a much better lubrication of the different mechanical parts, such as gears of a gear box, being in very fast motion during an emergency situation.

According to a possible embodiment of the invention, said drive shaft constitutes
a common drive shaft intended for driving at least a first rotating pumping member and at least a second rotating pumping member by a driving means driving the drive shaft, and
said pump further being provided with a mechanical coupling arrangement between the at least first pumping member and the at least second pumping member.

By having the drive shaft driving at least two pumping members, and by providing a mechanical coupling arrangement, one of the pumping members may be coupled out and in as necessary. Alternatively, or additionally, the pumping capacity of one of the pumping members may be adjusted infinitely or stepwise by means of adjusting a transfer ratio of the mechanical coupling arrangement between the two pumping members.

The system exhibits a plurality of individual pumps arranged on the same drive shaft and coupled together by a coupling arrangement transmitting all the torque of the drive shaft or only a limited amount of the torque of the drive shaft to one or more of the pumps. In the case all the torque is transmitted to all of the pumps, the device is incorporated in a system capable of distributing the hydraulic fluid in a selected and controlled manner.

In an alternative embodiment, the mechanical coupling arrangement is provided by means of a single shaft constituting an output shaft of the first pumping member and an input shaft of the second pumping member, said single shaft thereby being common to the two pumping members. This embodiment establishes no means for coupling the one pumping member out and in and no means for infinitely or stepwise adjustment of transfer ratio. However, the object of the invention may still be obtained by selecting different pumping members having different fluid capacities and having differing incremental change of flow, when the rotational speed of the drive shaft decreases or increases.

According to a possible embodiment of the invention said drive shaft comprises
a drive shaft intended for driving at least a second rotating pumping member (2) by a primary driving means driving the drive shaft, and said pump having
an output shaft intended for driving at least a first rotating pumping member by a secondary driving means driving the output shaft,
said pump further being provided with a hydraulic coupling arrangement between the at least second pumping member and the driving means driving the output shaft.

By providing a hydraulic coupling arrangement, the possibilities are enhanced of adjusting the fluid flow capacity of the fluid supply system. Also, the possible disadvantages of mechanical coupling arrangements such as wear and slow change of torque ratio may be avoided. Also the advantages of a mechanical pumping member and an electrically controlled pump is obtained by employing a hydraulic coupling arrangement.

In a preferred embodiment of a hydraulic coupling arrangement,
the hydraulic coupling arrangement is provided by means of a hydraulics outlet constituting an output from a second pumping member, and
a hydraulics inlet constituting an input to a hydraulic motor intended for driving the first pumping member, and
the hydraulic motor comprising the output shaft intended for driving an input shaft of the at least first rotating pumping member, said output shaft and said input shaft thereby being common to the hydraulic motor and the at least first pumping member.

An arrangement with a common output shaft from the hydraulic motor and input shaft of the first pumping member result in no mechanical coupling arrangements at all being employed, and thus all torque transfer takes place by means of hydraulics.

In alternative embodiments along the inventive concept of a hydraulic coupling arrangement, said pump is instead provided with a pneumatic coupling arrangement between the at least first pumping member and the secondary driving means driving the output shaft, or even in the alternative, said pump is instead being provided with an electric coupling arrangement between the at least first pumping member and the secondary driving means driving the output shaft.

Pneumatic and electric coupling arrangements has a limited capability of transferring torque from the pneumatic motor and electric motor, respectively, to the first pumping member, but pneumatic and electric coupling arrangements have the advantage of being more "clean" transfer means than hydraulics, if leakage of torque transfer "medium" should occur. In the event of an electrical coupling arrangement, also the speed of adjustment is often faster than hydraulic and pneumatic coupling arrangements.

The coupling arrangement, independently on whether the coupling arrangement is mechanical, hydraulic, pneumatic, electric or a combination of two or more of such coupling arrangements, is all the time a coupling either capable of infinitely variably adjusting the rotational speed of the second pumping member independently of any change in the rotational speed of the drive shaft, or capable of stepwise adjusting the rotational speed of the second pumping member independently of any change in the rotational speed of the drive shaft.

A combination of an infinite adjustment and a stepwise adjustment may be envisaged, perhaps with an infinite adjustment, when the rotational speed of the drive shaft is at a certain decreased level such as during idling of the wind turbine, and a stepwise adjustment, when the rotational speed of the drive shaft is at a certain increased level such as during a possible emergency situation during the operation of the wind turbine.

Preferably, the driving means for driving the drive shaft is a mechanical driving means such as an output shaft of a gearbox. Alternative driving means for driving the drive shaft may however be utilised, e.g. an electrical driving means such as an electrical motor, or e.g. a hydraulic driving means such as a hydraulic motor, or e.g. a main shaft of a rotor of a wind turbine. During idling of a wind turbine, both electrical energy from the grid and mechanical energy from the rotor of the wind turbine are available. During an emergency situation, often the electrical energy from the grid is not available. Therefore, electrical driving means is not the best means during an emergency situation. It necessitates either a battery back-up or the possibility of extracting electrical energy from the generator.

In a possible embodiment, the at least first pumping member and the at least second pumping member are capable of pumping the fluid independently of the rotational direction of the first and second pumping member. If possible, a preferred one-way rotational direction of the pumping members will enable use of pumping impellers being dedicated to one way of rotation, and thus possibly exhibiting a higher pumping efficiency.

Mechanical coupling arrangements are possibly an epicyclic 3-way differential with one shaft connected to an output drive shaft of the first pumping member, one shaft connected to an input drive shaft of the second pumping member, and the third shaft connected to a speed-variable motor, e.g. an electrical motor or a hydraulic motor. Such an epicyclic 3-way differential is a good and reliable mechanical means for obtaining infinite adjustment of the coupling arrangement. Mechanical coupling arrangements may also encompass a hydrostatic transmission from the output drive shaft of the first pumping member to the input drive shaft of the second pumping member. Hydrostatic coupling arrangements have the advantage of providing possibilities of reducing or even eliminating operating problems also at different than normal operating conditions such as maintaining sufficient lubrication of bearings etc. during very light wind conditions or during electrical power failure.

The object may also be obtained by a fluid outlet of the first pump leading only to a main fluid conduit, and the fluid outlet of the second pump leading both to the main fluid conduit and leading to a branch fluid conduit of the fluid system, said branch fluid conduit being provided with a control valve for controlling the flow of fluid through the branch fluid conduit in relation to the flow fluid to the main fluid conduit. Such a branch fluid conduit being provided with a control valve is a good and reliable hydraulic or pneumatic means for obtaining infinite adjustment of the coupling arrangement. The branch fluid conduit will be leading to one of the following fluid elements: The inlet of the first pump, a fluid reservoir, and the inlet of the second pump.

BRIEF DESCRIPTION OF THE DRAWINGS

The invention will be hereafter be described with reference to the drawings, where FIGS. 3-12 show diagrams of various control methods for controlling the fluid displacement pump according to the invention.

DETAILED DESCRIPTION

Figure 1:
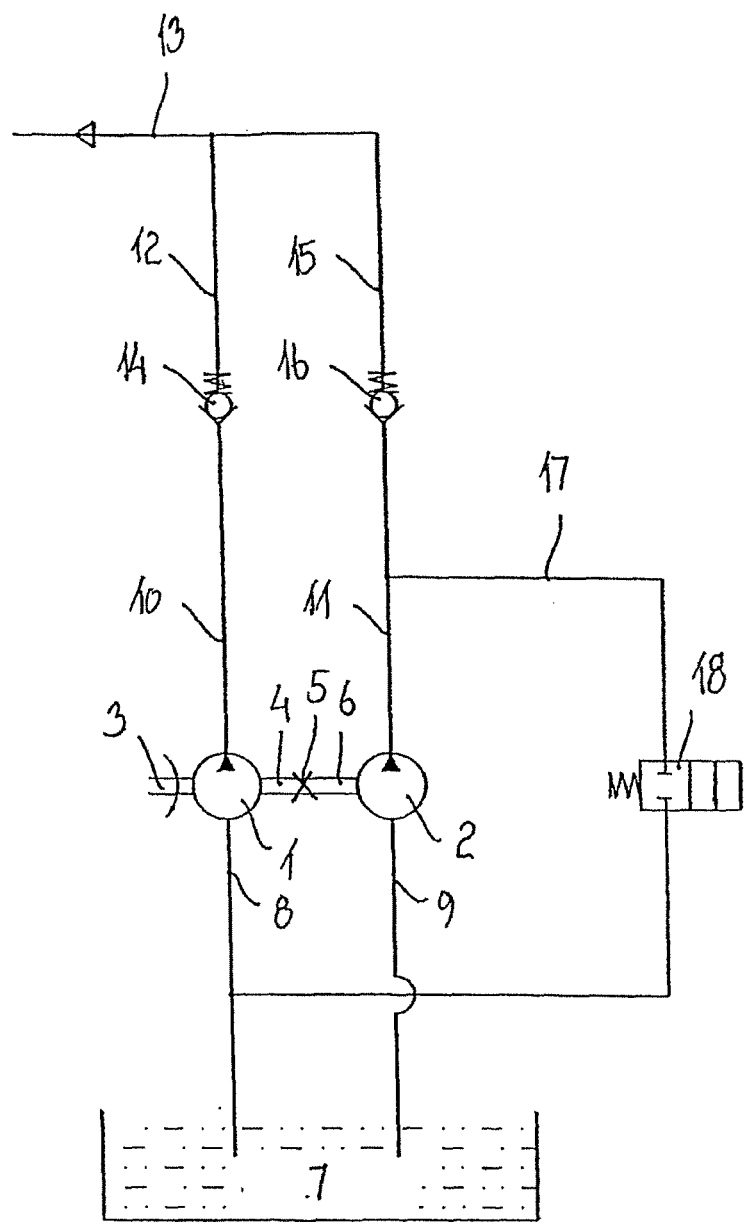
FIG. 1 shows a first possible embodiment of a fluid displacement pump according to the invention and of a fluid supply system according to the invention.

FIG. 1 shows a fluid displacement pump comprising a drive shaft 3, possibly a power take-out from the drive train of an energy converting plant such as a wind turbine. The drive shaft is intended for driving a first pump 1 and a second pump 2.

In the embodiment shown, the first pump is a separate pumping member and the second pump is also a separate pumping member. In an alternative embodiment, the first pumping member and the second pumping member could be part of a common fluid displacement pump, perhaps contained in one housing or at least forming one unit.

The drive shaft 3 is intended for driving the first pump 1 and the second pump 2 simultaneously. An output shaft 4 of the first pump is coupled by a purely mechanical or a hydromechanical or perhaps a pneumo-mechanical coupling arrangement 5 to an input shaft 6 of the second pump. The coupling arrangement 5 may transfer all the torque from the output shaft 4 of the first pump to the input shaft 6 of the second pump, or the coupling arrangement 5 may transfer only part of the torque. The coupling arrangement 5 may be set to a fixed ratio of torque transfer, or the coupling arrangement 5 may be adjustable for selecting and controlling the ratio of torque transferred. In an alternative embodiment, the coupling arrangement 5 is fixed, and the coupling arrangement 5 is provided by the output shaft 4 of the first pump 1 being the same as the input shaft 6 of the second pump 2, i.e. a single shaft thereby being common to the two pumps 1,2.

The fluid supply system comprises a fluid reservoir 7 supplying fluid to an individual first inlet 8 and an individual second inlet 9 of the first pump 1 and the second pump 2, respectively. In the embodiment shown, the fluid reservoir 7 is a reservoir common to both the first pump 1 and the second pump 2. Alternatively, more fluid reservoirs may be provided, one for each of the pumps 1,2 of the fluid displacement system. Also, in the embodiment shown, each of the pumps 1,2 has an individual inlet 8,9 leading directly from the fluid reservoir 7 to the pumps 1,2. Alternatively, each of the pumps 1,2 may have individual inlets 8,9 provided as parallel inlets, but being branched off a single common conduit (not shown), said single common inlet leading from the fluid reservoir 7 to each of the branched off individual inlets 8,9.

The first pump 1 and the second pump 2 are provided with an individual first outlet 10 and an individual second outlet 11, respectively. The first outlet 10 of the first pump 1 leads directly, via a first fluid conduit 12, to a main fluid conduit 13 and further to a gear mechanism (not shown) or other mechanical mechanism intended for being lubricated. The first fluid conduit 12 may be provided with a parallel fluid conduit (not shown) equipped with a cooling unit (not shown) for cooling all or part of the fluid of the first outlet 10. Also, the first outlet 10 is provided with a non-return valve 14 opening at a certain high pressure of the fluid in the first fluid conduit 12. The second outlet 11 of the second pump 2 leads to the main fluid conduit 13 and further to the gear mechanism (not shown) or other mechanical mechanism via a second fluid conduit 15. The second fluid conduit 15 may be provided with a parallel fluid conduit (not shown) equipped with a cooling unit (not shown) for cooling all or part of the fluid of the second outlet 11. The second fluid conduit 15 is provided with a non-return valve 16 opening at a certain high pressure of the fluid in the second fluid conduit 15.

The second outlet 11 of the second pump also leads to a branch fluid conduit 17, said branch fluid conduit 17 leading to the first inlet 8 of the first pump 1. The branch fluid conduit 17 is provided with a control valve 18. The control valve is adjustable and may be controlled automatically or manually to close at a certain low pressure of the fluid in the main fluid conduit 13. The certain low pressure in the main conduit 13 may be monitored directly by monitoring the fluid pressure in the main fluid conduit 13. Alternatively, the certain low pressure in the main fluid conduit 13 may be monitored indirectly by monitoring the fluid pressure in the first fluid conduit 12 and in the second fluid conduit 15, and adding the pressure in each of these conduits 12, 15 for establishing the pressure in the main fluid conduit 13.

The second pump 2 is intended for increasing the amount of fluid being led to the gear mechanism or other mechanical mechanism in such situations, where the rotational speed of the drive shaft 3 is reduced to a certain low level or is increased to a certain high level. Such situation may be where the rotational speed of the drive shaft 3 is reduced or increased in relation to a regular rotational speed of the drive shaft during regular operating conditions of the gear mechanism or other mechanical mechanism. During a regular rotational speed, the fluid pressure in the main fluid conduit 13 is adequate for providing a lubrication ensuring that the gear mechanism (not shown) or other mechanical equipment being lubricated is not subjected to excessive wear due to a non-adequate lubrication of the mechanism.

During regular operating conditions, the fluid from the outlet 11 of the second pump 2 is directed into the branch fluid conduit 17, through the control valve 18 and to the inlet 8 of the first pump 1. The control valve allows the fluid in the branch conduit 17 to pass the control valve 18 due to the fact that the fluid pressure in main fluid conduit 13 is monitored and established as being adequately high for lubrication of the mechanism. Thus, the fluid from the second pump 2 is added to the fluid leading to the first pump 1.

Alternatively to, or in addition to, providing a control valve 18, the coupling arrangement 5 between the output shaft 4 of the first pump and the input shaft 6 of the second pump may be adjustable in order to adjust the torque transferred from the output shaft of the first pump to the input shaft of the second pump. Thereby, the amount of fluid pumped from the second pump to the inlet of the first pump along the branch fluid conduit 17 is adjusted. Thus, the control valve may be omitted, but the control valve may also be maintained for obtaining enhanced possibilities of controlling the pumping system.

During reduced or increased rotational speed of the drive shaft 3, the control valve 18 is closed or the fluid is passed through the control valve 18 at only a decreased flow. Thereby, the pressure of the fluid from the outlet 11 of the second pump 2 is increased and is passed through the second fluid conduit 15 through the non-return valve 16 and to the main fluid conduit 13.

During reduced rotational speed of the drive shaft 3, the first pump is still pumping fluid from the first outlet 8 to the main fluid conduit 13, but due to the reduced rotational speed of the drive shaft 3, only a limited amount of fluid is pumped to the main fluid conduit 13 by the first pump, i.e. the fluid capacity is reduced. However, because of the second pump also pumping fluid to the main fluid conduit 13, the total amount of fluid, i.e. the total fluid capacity, pumped to the main fluid conduit 13 is sufficient to lubricate the gear mechanism, also during reduced rotational speed of the drive shaft.

During increased rotational speed of the drive shaft 3, the first pump is pumping fluid from the first outlet 8 to the main fluid conduit 13, but despite the increased rotational speed of the drive shaft 3, still a limited, non-sufficient amount of fluid is pumped to the main fluid conduit 13 by the first pump, i.e. the fluid capacity is too low. However, because of the second pump also pumping fluid to the main fluid conduit 13, the total amount of fluid, i.e. the total fluid capacity, pumped to the main fluid conduit 13 is sufficient to lubricate the gear mechanism, also during increased, but still limited, rotational speed of the drive shaft.

As a supplement or as an alternative, the pumping capacity of second pump 2 may be controlled by the coupling arrangement 5 between the output shaft 4 of the first pump 1 and the input shaft 6 of the second pump 2. Thus, controlling of the pumping capacity of the second pump 2 by means of the coupling arrangement 5 may be employed together with the fluid system described above and shown in the figure.

Alternatively, controlling of the pumping capacity of the second pump 2 by means of the coupling arrangement 5 may be employed with a fluid system described above and shown in the figure, however, without the branch fluid conduit 17 and without the control valve 18 described and shown, and perhaps also without the non-return valve 16 of the second fluid conduit.

In case the pumping capacity of the second pump 2 is controlled also, or only, by means of the coupling arrangement 5, different types of coupling arrangements 5 may be employed. The coupling arrangement 5 may be a coupling capable of infinitely variably adjusting the rotational speed of the input shaft 6 second pump 2 independently on any change in the rotational speed of the drive shaft 3. The coupling arrangement 5 may also be a coupling capable of stepwise adjusting the rotational speed of the input shaft 6 of second pump 2 independently on any change in the rotational speed of the drive shaft 3.

The driving means (not shown) driving the drive shaft 3 may be an electrical driving means such as an electrical motor, or a mechanical driving means such as an output shaft from a gearbox, or a hydraulic driving means such as a hydraulic motor.

The coupling arrangement 5 shown in FIG. 1 may comprise an epicyclic 3-way differential with one shaft connected to an output drive shaft of the first pumping member, one shaft connected to an input drive shaft of the second pumping member, and the third shaft connected to a speed-variable motor, for example an electrical motor or a hydraulic motor.

The coupling may comprise a hydrostatic transmission from the output drive shaft of the first pump to the input drive shaft of the second pump, or a hydrodynamic transmission from the output drive shaft of the first pump to the input drive shaft of the second pump, or a mechanical coupling, a viscous coupling or electric coupling or a electro-mechanical coupling from the output drive shaft of the first pump to the input drive shaft of the second pump. Furthermore, the coupling may be based on electro-technical principles such as electromagnetic transmission or Eddie-current.

Figure 2:
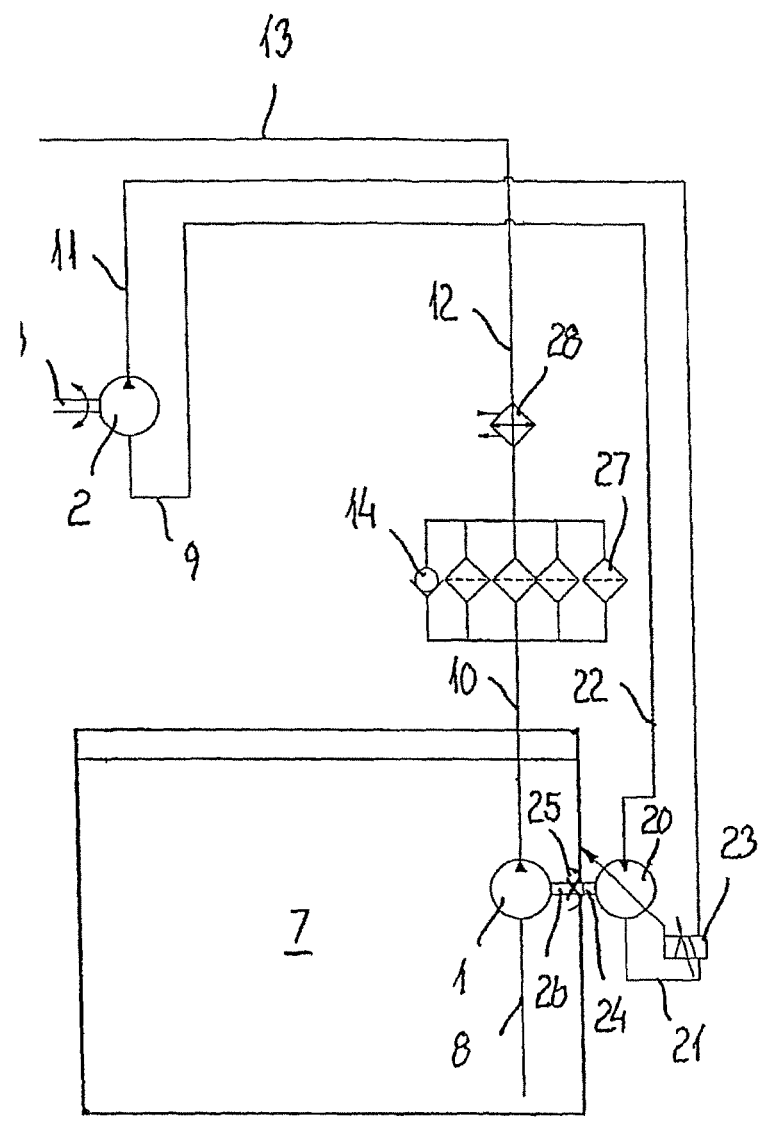
FIG. 2 shows a second possible embodiment of a fluid displacement pump according to the invention and of a fluid supply system according to the invention.

FIG. 2 shows a fluid displacement pump also comprising a drive shaft 3, possibly a power take-out from the drive train of a energy converting plant such as a wind turbine. The drive shaft 3 is intended for driving a pump 2. A purely hydraulic coupling arrangement 5 is constituted by a closed-loop fluid conduit leading from a fluid outlet 11 of the pump 2 to a fluid inlet 21 of a hydraulic motor 20 and from a fluid outlet 22 of the hydraulic motor 20 and to a fluid inlet 9 of the pump 2.

The closed-loop hydraulic coupling arrangement 5 is provided with a control valve 23. The control valve 23 is adjustable and may be controlled automatically or manually to adjust the pressure of the fluid in the closed-loop hydraulic coupling arrangement at a position in advance of the fluid inlet 21 of the hydraulic motor 20. The pressure in the closed-loop hydraulic coupling arrangement 5 may be monitored anywhere along the closed-loop hydraulic coupling arrangement 5. Alternatively, adjustment of the control valve 23 may be effected by monitoring the pressure in a main fluid conduit 13 of the fluid supply system for establishing the pressure in the closed-loop hydraulic coupling arrangement 20.

An output shaft 24 of the hydraulic motor 20 is coupled by a purely mechanical or a hydromechanical or perhaps a pneumo-mechanical coupling arrangement 25 to an input shaft 26 of a first pump 1. The coupling arrangement 25 may transfer all the torque from the output shaft 24 of the hydraulic motor 20 to the input shaft 26 of the first pump 1, or the coupling arrangement 25 may transfer only part of the torque. The coupling may be set to a fixed ratio of torque transfer, or the coupling may be adjustable for selecting and controlling the ratio of torque transferred. In an alternative embodiment, the coupling arrangement 25 is fixed, and the coupling arrangement is provided by the output shaft 24 of the hydraulic motor 20 being the same as the input shaft 26 of the first pump 1, i.e. a single shaft thereby being common to the hydraulic motor 20 and the first pump 1.

In the embodiment shown, the first pump is a separate pumping member and the second pump is also a separate pumping member. In an alternative embodiment, the first pumping member and the second pumping member could be part of a common fluid displacement pump, perhaps contained in one housing or at least forming one unit.

The fluid supply system comprises a fluid reservoir 7 supplying fluid to an individual first inlet 8 of the first pump 1. In the embodiment shown, the first pump 1 is submerged in the fluid in the fluid reservoir 7, thereby ensuring that the first pump in all situations is always supplied with hydraulic lubrication fluid. This placement of the first pump 1 necessitates a fluid tight sealing of the coupling arrangement 25 at a position between the hydraulic motor 20 and the first pump 1, when the coupling arrangement 25 passes through the boundaries of the reservoir 7.

Alternatively, the hydraulic motor 20 may also be submerged in the fluid in the fluid reservoir 7, thus eliminating the need for a fluid tight sealing of the coupling arrangement 25 between the hydraulic motor 20 and the first pump 1. Even alternatively, the first pump 1 may be placed outside the fluid in the fluid reservoir, such as shown in FIG. 1, together with the hydraulic motor 20 also being placed outside the fluid in the fluid reservoir 7, such as shown in FIG. 2.

The first pump is provided with an individual first outlet 10. The first outlet of the first pump 1 leads directly, via a first fluid conduit 12, to the main fluid supply 13 and further to a gear mechanism (not shown) or other mechanical mechanism intended for being lubricated. In the embodiment shown, the first supply conduit 12 and the main fluid supply 13 are not actually divided into two conduits, but are one and the same conduit.

During reduced rotational speed of the drive shaft 3, the first pump is still pumping fluid from the first outlet 10 to the main fluid conduit 13, but due to the reduced rotational speed of the drive shaft 3, only a limited amount of fluid is pumped to the main fluid conduit 13 by the first pump, i.e. the fluid capacity is reduced. However, because of the pump 2 still operating and because of the hydraulic motor being adjustable, the pumping capacity of the first pump may be increased in order to pump more fluid to the main fluid conduit 13. Thus, the total amount of fluid, i.e. the total fluid capacity, pumped to the main fluid conduit 13 may be maintained to be sufficient to lubricate the gear mechanism, also during reduced rotational speed of the drive shaft.

During increased rotational speed of the drive shaft 3, the first pump is pumping fluid from the first outlet 8 to the main fluid conduit 13, but despite the increased rotational speed of the drive shaft 3, still a limited, non-sufficient amount of fluid is pumped to the main fluid conduit 13 by the first pump, i.e. the fluid capacity is too low. However, because of the pump 2 operating and because of hydraulic motor being adjustable, the pumping capacity of the first pump 1 may be increased in order to pump more fluid to the main fluid conduit 13. Thus, the total amount of fluid, i.e. the total fluid capacity, pumped to the main fluid conduit 13 may be increased to be sufficient to lubricate the gear mechanism, also during increased, but still limited, rotational speed of the drive shaft.

In the embodiment shown, between the first outlet 10 and the fluid conduit 12 parallel fluid conduits are provided. Four of the parallel conduits are equipped with filters 27, and one of the parallel conduits is equipped with a non-return valve 14. Other numbers than four conduits with filters, such as more or less numbers, may be provided and more numbers than one conduit with a non-return valve may be provided.

During regular operating conditions, the fluid from the first pump 1 is directed trough the all the filters 27. If one, more or all of the filters 27 for some reason are blocking the direction of fluid from the outlet 10 to the first fluid conduit 12, the non-return valve 14 will open, ensuring adequate lubrication of the gear mechanism or other mechanism to be lubricated, although by non-filtered fluid from the fluid reservoir 7.

In the embodiment shown, between the first outlet 10 and the fluid conduit 12 a cooling unit 28 is provided for cooling all or part of the fluid of the first outlet 10. Alternatively to providing the cooling unit 28 in the fluid conduit 12, one or more cooling units may be provided in the parallel conduits, where also the filters 27 are provided. Thereby, both filtering and cooling may be accomplished in more than one conduit. If one cooling unit in one of the parallel conduits fails, other cooling units provided in the other parallel conduits may still be available for cooling the fluid.

The fluid displacement pump according to the invention may comprise an automatic actuator for varying the torque ratio of said coupling arrangement 5. The automatic actuator may be a mechanical, electrical, or hydraulic device connected to a control system. The automatic actuator may be closed-loop controlled on base of any parameter from the oil supply system, for example based on pressure in at least one of the outlets 10,11 of the at least two pumps 1,2. The automatic actuator may be regulated by an external control system based on one or more parameters describing the performance of the fluid supply system, or the performance of the gear mechanism or other mechanism to be lubricated, or even the performance of the entire equipment which the fluid supply system and the mechanism are part of. The automatic actuator may be controlled in a failsafe mode such that a defined flow is obtained at system failure, for example to secure a safe run-down of the equipment in case of loss of external power.

In the embodiment shown in FIG. 2, the second pumping member 2 is described as being a hydraulic pump supplying hydraulic pressure to the hydraulic motor 20. However, the second pumping member 2 may also be a pneumatic pump supplying pneumatic pressure to a pneumatic motor. The fundamental principle is the same as when employing a hydraulic pump and a hydraulic motor, however, the coupling arrangement is of pneumatic nature rather than of hydraulic nature. When the second pumping member is a hydraulic pump, an outlet of a fluid reservoir for supplying hydraulic fluid to the hydraulic is preferably provided at a horizontal level above the inlet of the hydraulic pump, thereby ensuring that the hydraulic pump in all situations is supplied with hydraulic pump fluid.

Even alternatively, the second pumping member 2 may be substituted by an electric energy generating element, such as a generator, positioned at the same location of the fluid supply system as the second pump 2 shown in FIG. 2, and intended for supplying electrical energy to an electric motor 20, positioned at the same location of the fluid supply system as the hydraulic motor shown in FIG. 2. The fundamental principle is the same as when employing a hydraulic pump and a hydraulic motor, however, the coupling arrangement is of electrical nature rather than of hydraulic nature.

FIGS. 3-12 are diagrams of various modes of controlling the fluid displacement pump. The various modes shown in FIGS. 3-12 all take the basis in the coupling being hydraulic between a gear-driven pump, i.e. the first pumping member, and the fluid pump for lubricating bearing and the like, i.e. the second pumping member.

In all diagrams at least one hydraulic pump 30 is shown in the top of the figures, said pump being driven through an input shaft 31 of the hydraulic pump, said input shaft being driven by a gear shaft from the gear box, and also at least one hydraulic motor 32 is shown in the bottom of the figures, said pump intended for driving an input shaft of the gear pump (not shown) through an output shaft 33 of the hydraulic motor.

FIG. 3 shows the hydraulic pump 30 being uni-directional, i.e. being capable of pumping fluid independently of the rotational direction of the input shaft, and thus being capable of pumping fluid both "from the left side" and "from the right side" of the hydraulic pump as seen in the figure. The corresponding hydraulic motor 32 is however a one-directional motor, i.e. being capable of operating only when fluid is pumped to an inlet at the right side of the hydraulic motor as seen in the figure. The hydraulic motor is provided with a variable control means 34, said means enabling varying the rotational speed of the output shaft of the hydraulic motor. In the embodiment shown, the variable control means is intended for being controlled by an electrically operating adjustment means 35, but hydraulic or mechanical control means and/or adjustment means is also possible.

If fluid is pumped by the hydraulic pump from the left side as seen in the figure, the fluid is pumped to a one-way valve 36 having a reduced opening pressure compared to other valves 38,39 of the system. The fluid is then pumped to the right side of the hydraulic motor, said right side having an inlet, and thus fluid pumped to the right side of the hydraulic motor enabling operation of the hydraulic motor. From the hydraulic motor, the fluid is passed to a return valve 37 also having a decreased opening pressure compared to other valves 38,39. Thus, if fluid is pumped from the left side of the hydraulic pump, a driving torque will be transmitted from the output shaft of the hydraulic motor to the gear pump (not shown).

If fluid is pumped by the hydraulic pump from the right side as seen in the figure, the fluid is pumped to a one-way valve 38 having an increased opening pressure compared to other valves 36,37 of the system. The fluid is then pumped also to the right side of the hydraulic motor, said right side having an inlet, and thus fluid pumped to the right side of the hydraulic motor also enabling operation of the hydraulic motor. From the hydraulic motor, the fluid is passed to a return valve 39 also having an increased opening pressure compared to other valves 36,37. Thus, if fluid is pumped from the right side of the hydraulic pump, a driving torque will also be transmitted from the output shaft of the hydraulic motor to the gear pump (not shown).

The reason for having return valves with increased and decreased opening pressure, respectively, is based on the rotational direction of the input shaft of the hydraulic pump. The rotational direction of the input shaft of the hydraulic pump is dependent on the rotational direction of the rotor (not shown) of the wind turbine. The possible feature of return valves in a hydraulic rectifier having both return valves with increased opening pressure and return valves with decreased opening pressure, applies to all embodiments as described below incorporating hydraulic rectifiers. The hydraulic rectifier is explained below.

If the hydraulic pump is pumping fluid from the left side of the hydraulic pump, the rotational direction of the input shaft corresponds to a reversed rotational direction of the rotor of the wind turbine. A reversed rotational direction of the rotor may be the case in light wind conditions, where sudden wind gusts may cause the rotor to rotate reversed compared to the intended rotational direction of the rotor. In light wind conditions, the fluid capacity of the hydraulic pump will be reduced, thus the need for return valves with decreased opening pressure for passing fluid to the hydraulic motor. Contrary to light wind conditions, i.e. in normal wind conditions or strong wind conditions, the rotational direction of the rotor will always be the intended rotational direction of the rotor, and the fluid will always be supplied from the right side of the hydraulic pump. In normal and strong wind conditions, the fluid capacity of the hydraulic pump will be increased and sufficient, thus the possibility of return valves with increased opening pressure for passing fluid to the hydraulic motor. However, in an alternative embodiment, the opening pressure of all return valves 36-39 may be identical.

FIG. 4 shows the hydraulic pump 30 being uni-directional, i.e. being capable of pumping fluid independently of the rotational direction of the input shaft, and thus being capable of pumping fluid both "from the left side" and "from the right side" of the hydraulic pump as seen in the figure. The hydraulic pump is provided with a variable control means 34, said means enabling varying the fluid capacity of the hydraulic pump. In the embodiment shown, the variable control means is intended for being controlled by an electrically operating adjustment means 35, but hydraulic or mechanical control means and/or adjustment means is also possible. The corresponding hydraulic motor 32 is however a one-directional motor, i.e. being capable of operating only when fluid is pumped to an inlet at the right side of the hydraulic motor as seen in the figure.

If fluid is pumped by the hydraulic pump from the left side as seen in the figure, the fluid is pumped to a one-way valve 36 having a reduced opening pressure compared to other valves 38,39 of the system. The fluid is then pumped to the right side of the hydraulic motor, said right side having an inlet, and thus fluid pumped to the right side of the hydraulic motor enabling operation of the hydraulic motor. From the hydraulic motor, the fluid is passed to a return valve 37 also having a decreased opening pressure compared to other valves 38,39. Thus, if fluid is pumped from the left side of the hydraulic pump, a driving torque will be transmitted from the output shaft of the hydraulic motor to the gear pump (not shown).

If fluid is pumped by the hydraulic pump from the right side as seen in the figure, the fluid is pumped to a one-way valve 38 having an increased opening pressure compared to other valves 36,37 of the system. The fluid is then pumped also to the right side of the hydraulic motor, said right side having an inlet, and thus fluid pumped to the right side of the hydraulic motor also enabling operation of the hydraulic motor. From the hydraulic motor, the fluid is passed to a return valve 39 also having an increased opening pressure compared to other valves 36,37. Thus, if fluid is pumped from the right side of the hydraulic pump, a driving torque will also be transmitted from the output shaft of the hydraulic motor to the gear pump (not shown).

FIG. 5 shows the hydraulic pump being uni-directional, i.e. being capable of pumping fluid in-dependently of the rotational direction of the input shaft, thus being capable of pumping fluid both "from the left side" and "from the right side" of the hydraulic pump as seen in the figure. The hydraulic pump is provided with a variable control means 34, said means enabling varying the fluid capacity of the hydraulic pump. In the embodiment shown, the variable control means is intended for being controlled by an electrically operating adjustment means 35, but hydraulic or mechanical control means and/or adjustment means is also possible. The corresponding hydraulic motor is also uni-directional, i.e. capable of exerting a driving torque to the output shaft in-dependently of whether fluid is provided at an inlet "at the left side" or at an inlet "at the right side" of the hydraulic motor as seen in the figure.

If fluid is pumped by the hydraulic pump either from the left side or from the right side as seen in the figure, the fluid is pumped directly either to the left side or to the right side of the hydraulic motor, both the left side and the right side of the hydraulic motor having an inlet. Thus, fluid being pumped either to the left side or to the right side of the hydraulic motor enables operation of the hydraulic motor and a driving torque being transmitted from the output shaft of the hydraulic motor to the gear pump (not shown).

FIG. 6 shows the hydraulic pump being uni-directional, i.e. being capable of pumping fluid independently of the rotational direction of the input shaft, thus being capable of pumping fluid both "from the left side" and "from the right side" of the hydraulic pump as seen in the figure. The corresponding hydraulic motor is also uni-directional, i.e. capable of exerting a driving torque to the output shaft in-dependently of whether fluid is provided at an inlet "at the left side" or at an inlet "at the right side" of the hydraulic motor as seen in the figure. The hydraulic motor is provided with a variable control means 34, said means enabling varying the rotational speed of the output shaft of the hydraulic motor. In the embodiment shown, the variable control means is intended for being controlled by an electrically operating adjustment means 35, but hydraulic or mechanical control means and/or adjustment means is also possible.

If fluid is pumped by the hydraulic pump either from the left side or from the right side as seen in the figure, the fluid is pumped directly either to the left side or to the right side of the hydraulic motor, both the left side and the right side of the hydraulic motor having an inlet. Thus, fluid being pumped either to the left side or to the right side of the hydraulic motor enables operation of the hydraulic motor and a driving torque being transmitted from the output shaft of the hydraulic motor to the gear pump (not shown).

FIG. 7 shows the hydraulic pump being uni-directional, i.e. being capable of pumping fluid independently of the rotational direction of the input shaft, thus being capable of pumping fluid both "from the left side" and "from the right side" of the hydraulic pump as seen in the figure. The corresponding hydraulic motor is also uni-directional, i.e. capable of exerting a driving torque to the output shaft independently of whether fluid is provided at an inlet "at the left side" or at an inlet "at the right side" of the hydraulic motor as seen in the figure.

If fluid is pumped by the hydraulic pump either from the left side or from the right side as seen in the figure, the fluid is pumped directly either to the left side or to the right side of the hydraulic motor, both the left side and the right side of the hydraulic motor having an inlet. Thus, fluid being pumped either to the left side or to the right side of the hydraulic motor enables operation of the hydraulic motor and a driving torque being transmitted from the output shaft of the hydraulic motor to the gear pump (not shown).

FIG. 8 shows the hydraulic pump being a one-directional pump, i.e. being capable of operating only when the input shaft is rotated in one direction and fluid is pumped from an inlet at the left side of the hydraulic pump as seen in the figure. The hydraulic pump is provided with a variable control means 34, said means enabling varying the fluid capacity of the hydraulic pump. In the embodiment shown, the variable control means is intended for being controlled by an electrically operating adjustment means 35, but hydraulic or mechanical control means and/or adjustment means is also possible. The corresponding hydraulic motor is also one-directional, i.e. being capable of operating only when fluid is pumped to an inlet at the left side of the hydraulic motor as seen in the figure.

If fluid is pumped by the hydraulic pump from the left side as seen in the figure, the fluid is pumped directly to the left side of the hydraulic motor. Thus, fluid being pumped to the left side of the hydraulic motor enables operation of the hydraulic motor and a driving torque being transmitted from the output shaft of the hydraulic motor to the gear pump (not shown).

Figure 9:
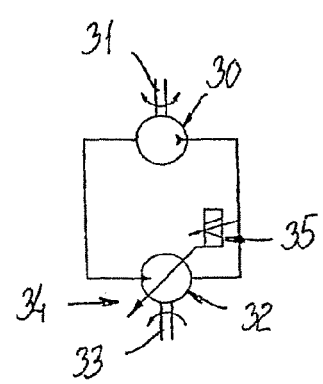

FIG. 9 shows the hydraulic pump being a one-directional pump, i.e. being capable of operating only when the input shaft is rotated in one direction and fluid is pumped from an inlet at the left side of the hydraulic pump as seen in the figure. The corresponding hydraulic motor is also one-directional, i.e. being capable of operating only when fluid is pumped to an inlet at the left side of the hydraulic motor as seen in the figure. The hydraulic motor is provided with a variable control means 34, said means enabling varying the rotational speed of the output shaft of the hydraulic motor. In the embodiment shown, the variable control means is intended for being controlled by an electrically operating adjustment means 35, but hydraulic or mechanical control means and/or adjustment means is also possible. FIG. 9 constitutes a best mode of operation.

If fluid is pumped by the hydraulic pump from the left side as seen in the figure, the fluid is pumped directly to the left side of the hydraulic motor. Thus, fluid being pumped to the left side of the hydraulic motor enables operation of the hydraulic motor and a driving torque being transmitted from the output shaft of the hydraulic motor to the gear pump (not shown).

Figure 10:
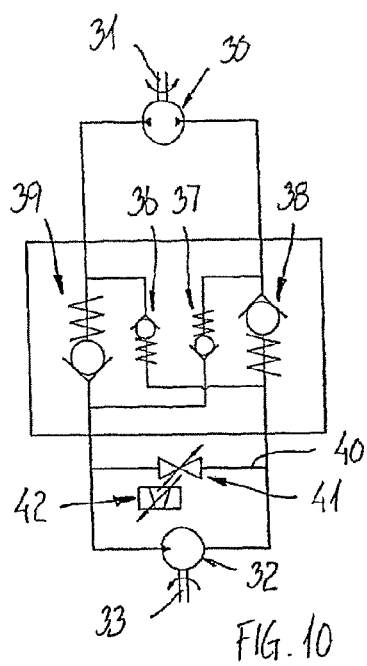

FIG. 10 shows the hydraulic pump being uni-directional, i.e. being capable of pumping fluid in-dependently of the rotational direction of the input shaft, thus being capable of pumping fluid both "from the left side" and "from the right side" of the hydraulic pump as seen in the figure. The corresponding hydraulic motor is however a one-directional motor, i.e. being capable of operating only when fluid is pumped to an inlet at the left side of the hydraulic motor as seen in the figure. A by-pass conduit 40 is provided between the inlet of the hydraulic motor and an outlet of the hydraulic motor. Said by-pass conduit is provided with a variable valve 41 and a variable control means 42 for controlling the variable valve, said valve and said means enabling varying the capacity of fluid being passed to the inlet of the hydraulic motor, independently of the capacity being provided from the either one of the outlets of the hydraulic pump. In the embodiment shown, the variable control means is intended for being controlled by an electrically operating adjustment means 35, but hydraulic or mechanical control means and/or adjustment means is also possible.

If fluid is pumped by the hydraulic pump from the left side as seen in the figure, the fluid is pumped to a one-way valve 36 having a reduced opening pressure compared to other valves 38,39 of the system. The fluid is then pumped to the right side of the hydraulic motor, said right side having an inlet, and thus fluid pumped to the right side of the hydraulic motor enabling operation of the hydraulic motor. From the hydraulic motor, the fluid is passed to a return valve 37 also having a decreased opening pressure compared to other valves 38,39. Thus, if fluid is pumped from the left side of the hydraulic pump, a driving torque will be transmitted from the output shaft of the hydraulic motor to the gear pump (not shown).

If fluid is pumped by the hydraulic pump from the right side as seen in the figure, the fluid is pumped to a one-way valve 38 having an increased opening pressure compared to other valves 36,37 of the system. The fluid is then pumped also to the right side of the hydraulic motor, said right side having an inlet, and thus fluid pumped to the right side of the hydraulic motor also enabling operation of the hydraulic motor. From the hydraulic motor, the fluid is passed to a return valve 39 also having an increased opening pressure compared to other valves 36,37. Thus, if fluid is pumped from the right side of the hydraulic pump, a driving torque will also be transmitted from the output shaft of the hydraulic motor to the gear pump (not shown).

Figure 11:
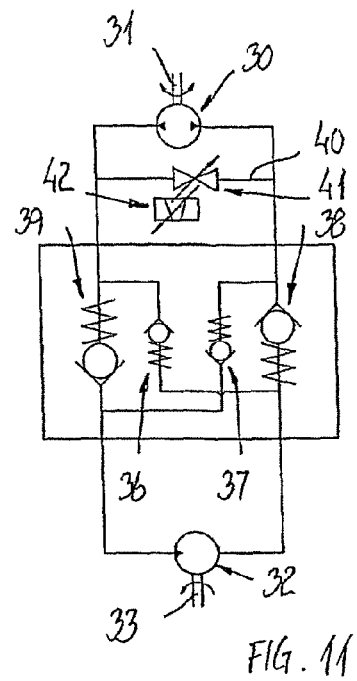

FIG. 11 shows the hydraulic pump being uni-directional, i.e. being capable of pumping fluid independently of the rotational direction of the input shaft, thus being capable of pumping fluid both "from the left side" and "from the right side" of the hydraulic pump as seen in the figure. The corresponding hydraulic motor is however a one-directional motor, i.e. being capable of operating only when fluid is pumped to an inlet at the left side of the hydraulic motor as seen in the figure. A by-pass conduit 40 is provided between the one outlet and the other outlet of the hydraulic pump. Said by-pass conduit is provided with a variable valve 41 and a variable control means 42 for controlling the variable valve, said valve and said means enabling varying the capacity of fluid being passed to the inlet of the hydraulic motor, independently of the capacity being provided from the either one of the outlets of the hydraulic pump. In the embodiment shown, the variable control means is intended for being controlled by an electrically operating adjustment means 35, but hydraulic or mechanical control means and/or adjustment means is also possible.

If fluid is pumped by the hydraulic pump from the left side as seen in the figure, the fluid is pumped to a one-way valve 36 having a reduced opening pressure compared to other valves 38,39 of the system. The fluid is then pumped to the right side of the hydraulic motor, said right side having an inlet, and thus fluid pumped to the right side of the hydraulic motor enabling operation of the hydraulic motor. From the hydraulic motor, the fluid is passed to a return valve 37 also having a decreased opening pressure compared to other valves 38,39. Thus, if fluid is pumped from the left side of the hydraulic pump, a driving torque will be transmitted from the output shaft of the hydraulic motor to the gear pump (not shown).

If fluid is pumped by the hydraulic pump from the right side as seen in the figure, the fluid is pumped to a one-way valve 38 having an increased opening pressure compared to other valves 36,37 of the system. The fluid is then pumped also to the right side of the hydraulic motor, said right side having an inlet, and thus fluid pumped to the right side of the hydraulic motor also enabling operation of the hydraulic motor. From the hydraulic motor, the fluid is passed to a return valve 39 also having an increased opening pressure compared to other valves 36,37. Thus, if fluid is pumped from the right side of the hydraulic pump, a driving torque will also be transmitted from the output shaft of the hydraulic motor to the gear pump (not shown).

Figure 12:
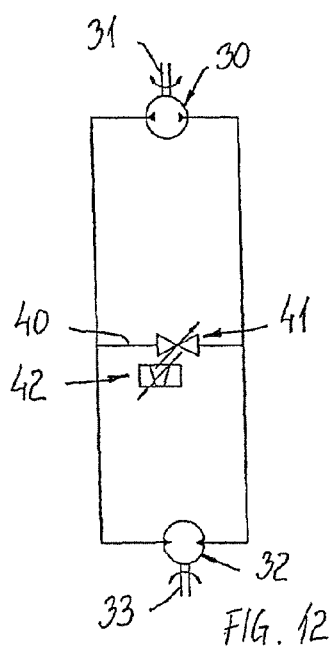

FIG. 12 shows the hydraulic pump being uni-directional, i.e. being capable of pumping fluid independently of the rotational direction of the input shaft, thus being capable of pumping fluid both "from the left side" and "from the right side" of the hydraulic pump as seen in the figure. The corresponding hydraulic motor is also uni-directional, i.e. capable of exerting a driving torque to the output shaft independently of whether fluid is provided at an inlet "at the left side" or at an inlet "at the right side" of the hydraulic motor as seen in the figure. A by-pass conduit 40 is provided between the one outlet and the other outlet of the hydraulic pump. Said by-pass conduit is provided with a variable valve 41 and a variable control means 42 for controlling the variable valve, said valve and said means enabling varying the capacity of fluid being passed to the inlet of the hydraulic motor, independently of the capacity being provided from the either one of the outlets of the hydraulic pump. In the embodiment shown, the variable control means is intended for being controlled by an electrically operating adjustment means 35, but hydraulic or mechanical control means and/or adjustment means is also possible.

If fluid is pumped by the hydraulic pump either from the left side or from the right side as seen in the figure, the fluid is pumped directly either to the left side or to the right side of the hydraulic motor, both the left side and the right side of the hydraulic motor having an inlet. Thus, fluid being pumped either to the left side or to the right side of the hydraulic motor enables operation of the hydraulic motor and a driving torque being transmitted from the output shaft of the hydraulic motor to the gear pump (not shown).

Figure 13:
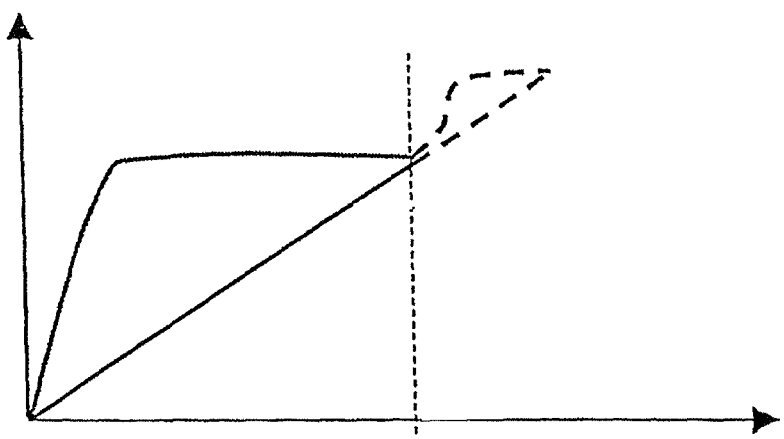
FIG. 13 shows a diagram of a possible relation between the rotational speed of a drive shaft for the fluid displacement pump and the capacity of fluid from the fluid displacement pump.

FIG. 13 is a diagram showing a possible relationship between the rotational speed of the drive shaft 3 (see FIG. 1 and FIG. 2) and the fluid flow to the gear mechanism or other mechanical mechanism to be lubricated. The fluid flow is established as the amount of fluid per time unit, but may also be established by monitoring the pressure in the main fluid supply 13 (see FIG. 1 and FIG. 2). The diagram shown is established based on the embodiment shown in FIG. 2. Similar relationship between the rotational speed of the drive shaft and the fluid flow will be the case for embodiments like the one shown in FIG. 1.

The diagram shows two curves, a first continuous curve with a linearly proportional extension with the one and same proportional ratio along the entire extension of the curve, and a second non-continuous curve with a proportional extension with different proportional ratios along different extensions of the curve. The first curve shows the relationship between rotational speed of drive shaft and fluid flow of a known system employing a mechanically driven fluid pump. The second curve shows the relationship between rotational speed of drive shaft and fluid flow of a system according to the invention, and employing a fluid pump according to FIG. 2 as described above.

As can be seen, when employing the known system with a mechanically driven fluid pump, the fluid flow and thus the possible lubricating capacity is decreased, whenever the rotational speed of the drive shaft is decreased, and vice versa. However, when employing a system according to the present invention, the fluid flow and thus the possible lubricating capacity is maintained along long intervals, when the rotational speed of the drive shaft is decreased, and vice versa. Along an initial interval, the fluid flow is increasing together with the rotational speed of the drive shaft. This is also the case, when employing known systems, but with a much smaller ratio. Thus, by employing the present invention compared to the known system, a high level of fluid flow, and thereby a high lubrication capacity, is obtained at a much lower rotational speed of the drive shaft.

Along and intermediate interval, when employing the known system, the fluid flow is still increasing towards the high level already obtained by the system according to the invention. The high level of fluid flow, when employing the known system, is obtained at a certain rotational speed of the drive shaft, marked with a vertical dotted line in the diagram. The certain rotational speed of the drive shaft may be as example 1.680 rpm of a drive shaft from a gearbox of a wind turbine. Subsequent to the certain rotational speed, along a final interval of the rotational speed of the drive shaft, the level of fluid flow continues to increase with a linear proportionality having the same proportional ratio as the rest of the first curve, i.e. the linear proportionality having the same ratio as along the initial interval and as along the intermediate interval.

When employing the system according to the present invention, the fluid flow is maintained substantially constant at the high level of fluid flow during the entire intermediate interval, when the rotational speed of the drive shaft is increasing. When reaching the certain rotational speed of the drive shaft as shown by the vertical dotted line, the system according to the invention is adjusted for further increasing the fluid flow by a ratio higher than the ratio of the known system. Thereby, when exceeding the certain rotational speed of the drive shaft, an even increased lubrication capacity is obtained along a final interval of the rotational speed of the drive shaft.

The course of the second curve may differ depending on the lubricating capacity necessary at the different rotational speeds of the drive shaft. Due to the possibility of adjusting the torque transferred along the coupling arrangement 5 between the first pump 1 and the second pump 2 (see FIG. 1) or between the hydraulic motor 10 and the first pump 1 (see FIG. 2), the fluid flow and thus the lubricating capacity may be adjusted in response to a certain need for lubrication at a certain rotational speed of the drive shaft.

Adjustment may be accomplished depending on different parameters such as the size and the type of gear mechanism of the wind turbine, or the size and type of wind turbine, if perhaps other mechanical means are to be lubricated. Adjustment may also be accomplished depending on the present operating conditions of the wind turbine such as the temperature, the wind speed and the wind stability or even other parameters, which may influence the mechanical parts of a wind turbine and thus may influence different needs for lubrication during operation of the wind turbine.

Methods for controlling the fluid pressure and/or of controlling the fluid capacity, and thus the lubricating capacity of the fluid supply system, in the fluid supply system of a wind turbine may be accomplished on the basis of different control scenarios:

One method comprises monitoring at least one parameter influencing a fluid pressure in the fluid supply system of the wind turbine, controlling a coupling arrangement between at least a first pumping member and at least a second pumping member, thereby obtaining a certain increased pumping capacity at a certain value of the at least one parameter being monitored. The parameters influencing the fluid pressure depends on the kind of coupling arrangement employed and also depends on which driving means is driving the drive shaft.

Another method comprises monitoring the rotational speed of the drive shaft of at least one of a first pumping member and a second pumping member, controlling the coupling arrangement between the at least first pumping member and the at least second pumping member, thereby obtaining a certain increased pumping capacity at a certain value of the rotational speed of the drive shaft. The rotational speed of the drive shaft is an important parameter as it is the drive shaft, which is the primary source for establishing the fluid pressure of the fluid supply system. Therefore, monitoring the rotational speed of the drive shaft is a good means of finding a basis for controlling the fluid pressure.

Even another method comprises monitoring an increment of the rotational speed of the drive shaft of at least one of a first pumping member and a second pumping member, controlling the coupling arrangement between the at least first pumping member and the at least second pumping member, thereby obtaining a certain increased pumping capacity at a certain reduced increment of the rotational speed of the drive shaft. As can be deducted from FIG. 1 and the description thereto, knowledge of the fluid flow in relation to the increase or decrease of the rotational speed of the drive shaft is a good tool for ensuring adequate lubrication at all levels of the rotational speed of the drive shaft.

Still even another method comprises monitoring the wind speed at the site of the wind turbine as a parameter influencing the rotational speed of a main shaft of the wind turbine, controlling the coupling arrangement between the at least first pumping member and the at least second pumping member, when the wind speed exhibits a value below 100 m/s or exhibits a value above 1 m/s, respectively, during a continuous period of time of at least 10 seconds, thereby obtaining a certain increased pumping capacity at a certain low value or at a certain high value, respectively, of the wind speed at the site of the wind turbine.

The rotational speed of the drive shaft may be related directly to the rotational speed of the main shaft of the wind turbine, and the rotational speed of the main shaft of the wind turbine may be related directly to the wind speed prevailing at any time at the site of the wind turbine. Thus, monitoring the wind speed at the site of the wind turbine may be a means for establishing an adequate fluid pressure at all levels or at selected levels of the rotational speed of the drive shaft.

Another method comprises monitoring the rotational speed of a main shaft of the wind turbine influencing the rotational speed of the drive shaft from a gearbox of the wind turbine, controlling the coupling arrangement between the at least first pumping member and the at least second pumping member, when the rotational speed of the main shaft exhibits a value below 100 rpm or exhibits a value above 0.01 rpm, respectively, during a continuous period of time of at least 10 seconds, thereby obtaining a certain increased pumping capacity at a certain low value or at a certain high value, respectively, of the rotational speed of the main shaft.

If the drive shaft is an output shaft from the gearbox, and if the rotational speed of the drive shaft is directly related to the rotational speed of the main shaft of the wind turbine, it is possible to monitor the rotational speed of the main shaft in order to establish the rotational speed of the drive shaft. Often, the rotational speed of the main shaft is monitored due to other reasons, and this already existing monitoring of the main shaft may then be used also for establishing the rotational speed of the drive shaft.

Especially during idling of the wind turbine, where the wind turbine for some reason is out of operation, and where the drive shaft exhibits a certain low rotational speed, and/or during an emergency, where the transmission to the grid is cut off, and where the drive shaft therefore may exhibit a sudden high rotational speed, the invention will show major advantages compared to known systems. The embodiments shown, and the methods described must not be viewed upon as limiting the scope of the present invention. Any modifications apparent to the person skilled in the art and falling within the scope of the claims must be viewed upon as falling within the scope of the present invention.

The invention claimed is:

1. A method of operating a fluid supply system of a wind turbine having a main shaft, the fluid supply system including a first pumping member and a second pumping member for supplying fluid to one or more components of the wind turbine and configured to be driven by the main shaft, the method comprising:
   monitoring the rotational speed of the main shaft;
   increasing the pumping capacity of the fluid supply system by controlling the second pumping member when the rotational speed of the main shaft falls below a first threshold value; and
   increasing the pumping capacity of the fluid supply system by controlling the second pumping member when the rotational speed of the main shaft is above a second threshold value greater than the first threshold value.

2. The method of claim 1, wherein the fluid supply system includes a branch fluid conduit for directing fluid from the second pumping member to one of a fluid reservoir or the first pumping member, wherein the step of controlling the second pumping member further comprises controlling the flow of fluid through the branch fluid conduit.

3. The method of claim 2, wherein controlling the flow of fluid through the branch fluid conduit comprises reducing the flow of fluid from the second pumping member through the branch fluid conduit.

4. The method of claim 3, wherein the branch fluid conduit includes a control valve, wherein reducing the flow through the branch fluid conduit comprises manipulating the control valve to increase the restriction to flow through the branch fluid conduit.

5. The method of claim 1, wherein the fluid supply system includes a coupling arrangement between the first and second pumping members, wherein the step of controlling the second pumping member further comprises controlling the coupling arrangement between the first and second pumping members.

6. The method of claim 5, wherein controlling the coupling arrangement further comprises transmitting at least a portion of the torque from an output of the first pumping member to an input of the second pumping member.

7. The method of claim 6, further comprising setting the coupling arrangement to transmit a fixed ratio of the torque to the second pumping member.

8. The method of claim 6, further comprising adjusting the coupling arrangement to vary the ratio of torque transmitted to the second pumping member.

9. The method of claim 8, further comprising stepwise adjusting the rotational speed of the second pumping member.

10. The method of claim 8, further comprising infinitely variably adjusting the rotational speed aped of the second pumping member.

11. The method of claim 1, wherein the first threshold value corresponds to the rotation of the main shaft during an idling mode of the wind turbine.

12. The method of claim 1, wherein the first threshold value is 0.1 rpm.

13. The method of claim 12, wherein the rotational speed of the main shaft falls below the first threshold value for a continuous period of 10 seconds before the increasing step is initiated.

14. The method of claim 1, wherein the second threshold value correspond to the rotation of the main shaft during a grid fault when transmission to the grid is cut off.

15. The method of claim 1, wherein the second threshold value is 100 rpm.

16. The method of claim 15, wherein the rotational speed of the main shaft is above the second threshold value for a continuous period of 10 seconds before the increasing step is initiated.

17. A method of operating a fluid supply system of a wind turbine having a main shaft, the wind turbine having an idling mode of operation when the rotation of the main shaft is below a first threshold value, a grid default mode of operation when the rotation of the main shaft is above a second threshold value, and a normal mode of operation when the rotation of the main shaft is between the first and second threshold values, the fluid supply system including a first pumping member and a second pumping member for supplying fluid to one or more components of the wind turbine and configured to be driven by the main shaft, the method comprising:
 monitoring the rotational speed of the main shaft;
 operating the first pumping member when the wind turbine is in the normal mode of operation;
 operating the second pumping member to increase the pumping capacity of the fluid supply system when the wind turbine is in the idling mode of operation; and
 operating the second pumping member to increase the pumping capacity of the fluid supply system when the wind turbine is in the grid default mode of operation.

18. The method of claim 17, wherein the fluid supply system includes a branch fluid conduit for directing fluid from the second pumping member to one of a fluid reservoir or the first pumping member, wherein the step of operating the second pumping member to increase the pumping capacity of the fluid supply system further comprises reducing the flow of fluid through the branch fluid conduit.

19. The method of claim 17, wherein the fluid supply system includes a coupling arrangement between the first and second pumping members, wherein the step of operating the second pumping member to increase the pumping capacity of the fluid supply system further comprises increasing the transmission of torque from an output of the first pumping member to an input of the second pumping member.

\* \* \* \* \*

UNITED STATES PATENT AND TRADEMARK OFFICE
CERTIFICATE OF CORRECTION

Page 1 of 3

PATENT NO. : 8,827,660 B2
APPLICATION NO. : 13/416581
DATED : September 9, 2014
INVENTOR(S) : Poul Spaerhage Frokjaer et al.

It is certified that error appears in the above-identified patent and that said Letters Patent is hereby corrected as shown below:

In the specification

Col. 1, lines 30-31 read: "...Lubrication and cooling of...is typically..."
Replace with: "...Lubrication and cooling of...are typically..."

Col. 3, lines 32-34 read: "...Also the advantages of...is obtained by..."
Replace with: "...Also the advantages of...are obtained by..."

Col. 3, lines 48-50 read: "An arrangement with...result in..."
Replace with: "An arrangement with...results in..."

Col. 3, line 61 reads: "...coupling arrangements has a..."
Replace with: "...coupling arrangements have a..."

Col. 4, line 38 reads: "...the first and second pumping member."
Replace with: "...the first and second pumping members."

Col. 5, line 9 reads: "The invention will be hereafter be described..."
Replace with: "The invention will hereafter be described..."

Col. 9, line 43 reads: "...is directed trough the all the filters..."
Replace with: "...is directed through all the filters..."

Col. 10, lines 18-19 read: "...a fluid reservoir for supplying hydraulic fluid to the hydraulic is..."
Replace with: "...a fluid reservoir for supplying hydraulic fluid to the hydraulic pump is..."

Signed and Sealed this
Twenty-ninth Day of December, 2015

Michelle K. Lee
*Director of the United States Patent and Trademark Office*

In the specification

Col. 10, lines 59-60 read: "...mechanical control means and/or adjustment means is also possible."
Replace with: "...mechanical control means and/or adjustment means are also possible."

Col. 11, lines 59-60 read: "...mechanical control means and/or adjustment means is also possible."
Replace with: "...mechanical control means and/or adjustment means are also possible."

Col. 12, line 24 reads: "...pumping fluid in-dependently of the..."
Replace with: "...pumping fluid independently of the..."

Col. 12, lines 33-34 read: "...but hydraulic or mechanical control means and/or adjustment means is also possible."
Replace with: "...but hydraulic or mechanical control means and/or adjustment means are also possible."

Col. 12, line 35 reads: "...in-dependently..."
Replace with: "...independently..."

Col. 12, line 54 reads: "...in-dependently..."
Replace with: "...independently..."

Col. 12, lines 62-63 read: "...mechanical control means and/or adjustment means is also possible."
Replace with: "...mechanical control means and/or adjustment means are also possible."

Col. 13, lines 34-35 read: "...mechanical control means and/or adjustment means is also possible."
Replace with: "...mechanical control means and/or adjustment means are also possible."

Col. 13, lines 58-59 read: "...mechanical control means and/or adjustment means is also possible."
Replace with: "...mechanical control means and/or adjustment means are also possible."

Col. 14, line 2 reads: "...in-dependently..."
Replace with: "...independently..."

CERTIFICATE OF CORRECTION (continued)
U.S. Pat. No. 8,827,660 B2

In the specification

Col. 14, lines 15-16 read: "...being provided from the either one of the..."
Replace with: "...being provided from either one of the..."

Col. 14, lines 19-20 read: "...mechanical control means and/or adjustment means is also possible."
Replace with: "...mechanical control means and/or adjustment means are also possible."

Col. 14, lines 60-61 read: "...provided from the either one of the..."
Replace with: "...provided from either one of the..."

Col. 14, lines 64-65 read: "...mechanical control means and/or adjustment means is also possible."
Replace with: "...mechanical control means and/or adjustment means are also possible."

Col. 15, lines 42-43 read: "...mechanical control means and/or adjustment means is also possible."
Replace with: "...mechanical control means and/or adjustment means are also possible."

Col. 16, lines 11-12 read: "...and thus the possible lubricating capacity is decreased,..."
Replace with: "...and thus the possible lubricating capacity are decreased,..."

Col. 16, line 25 reads: "Along and intermediate interval, when..."
Replace with: "Along an intermediate interval, when..."

Col. 17, line 38 reads: "As can be deducted from FIG. 1 and the description thereto,..."
Replace with: "As can be deduced from FIG. 1 and the description thereof,..."

In the claims

Col. 19, line 11, CLAIM 10 reads: "...variably adjusting the rotational speed aped of the second..."
Replace with: "...variably adjusting the rotational speed of the second..."

Col. 19, lines 22-23, CLAIM 14 read: "...wherein the second threshold value correspond to the..."
Replace with: "...wherein the second threshold value corresponds to the..."